(No Model.) 5 Sheets—Sheet 2.
F. J. SPRAGUE & P. F. O'SHAUGHNESSY.
ELECTRIC RAILWAY TROLLEY.
No. 504,255. Patented Aug. 29, 1893.
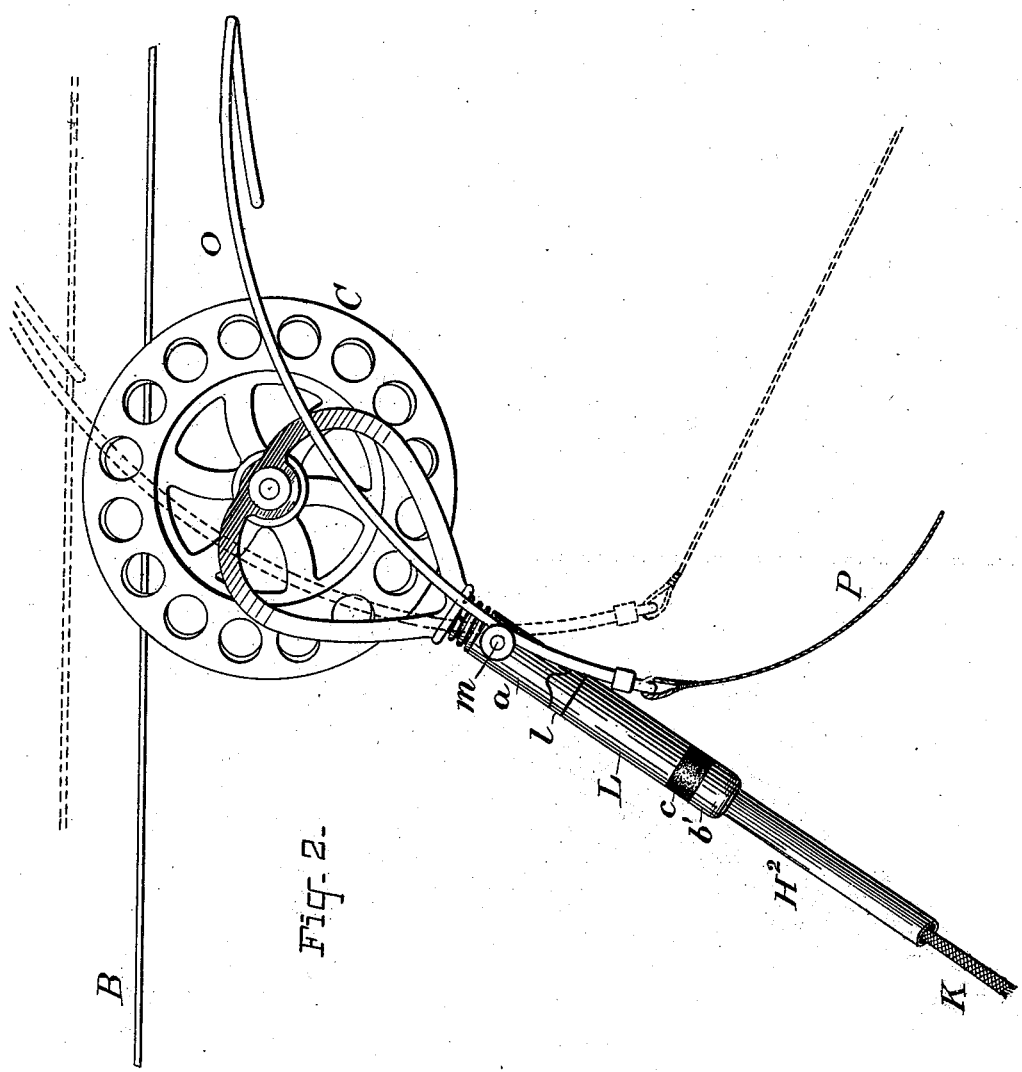
Witnesses
Inventors
Frank J. Sprague
Patrick F. O'Shaughnessy
By their Attorneys

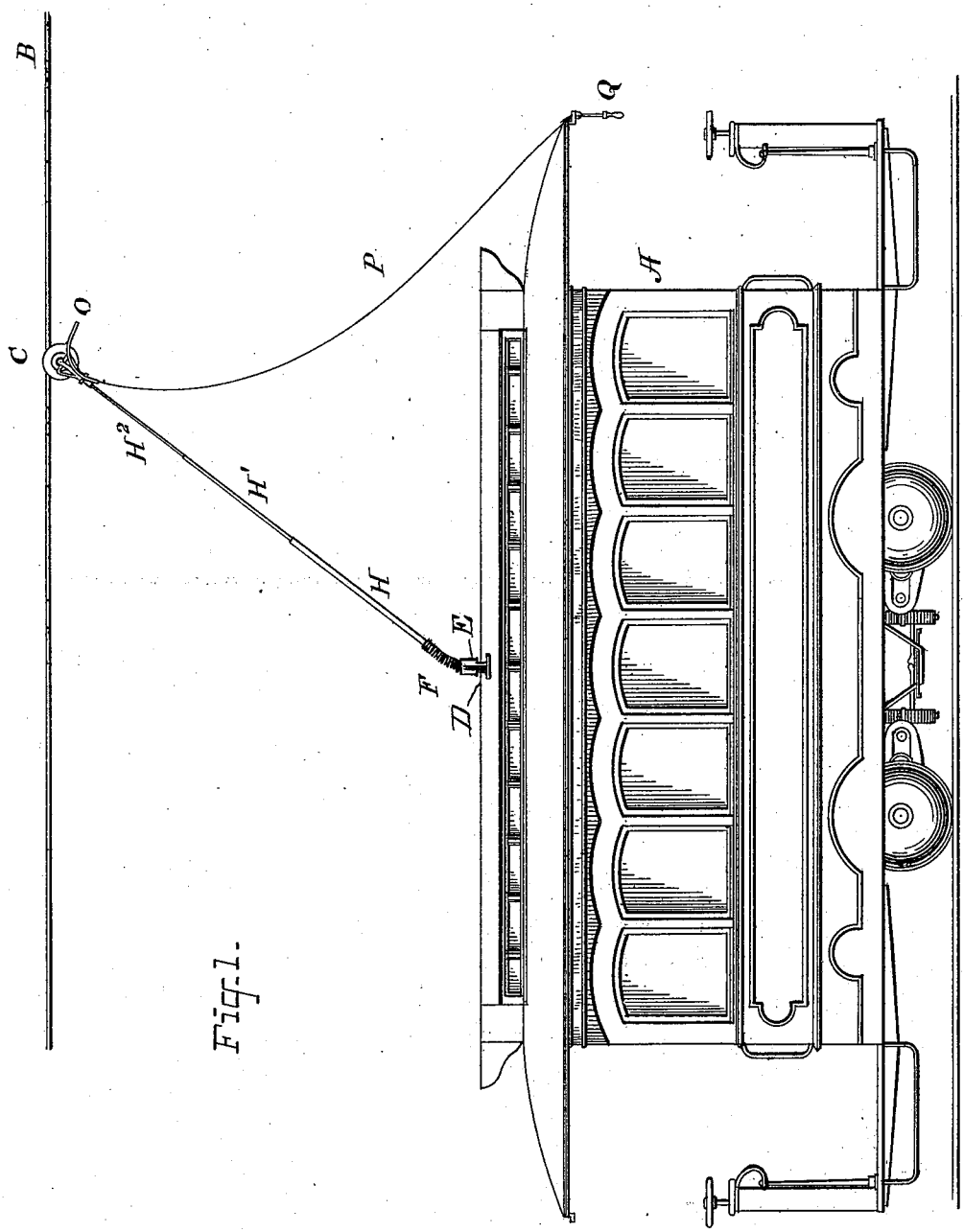

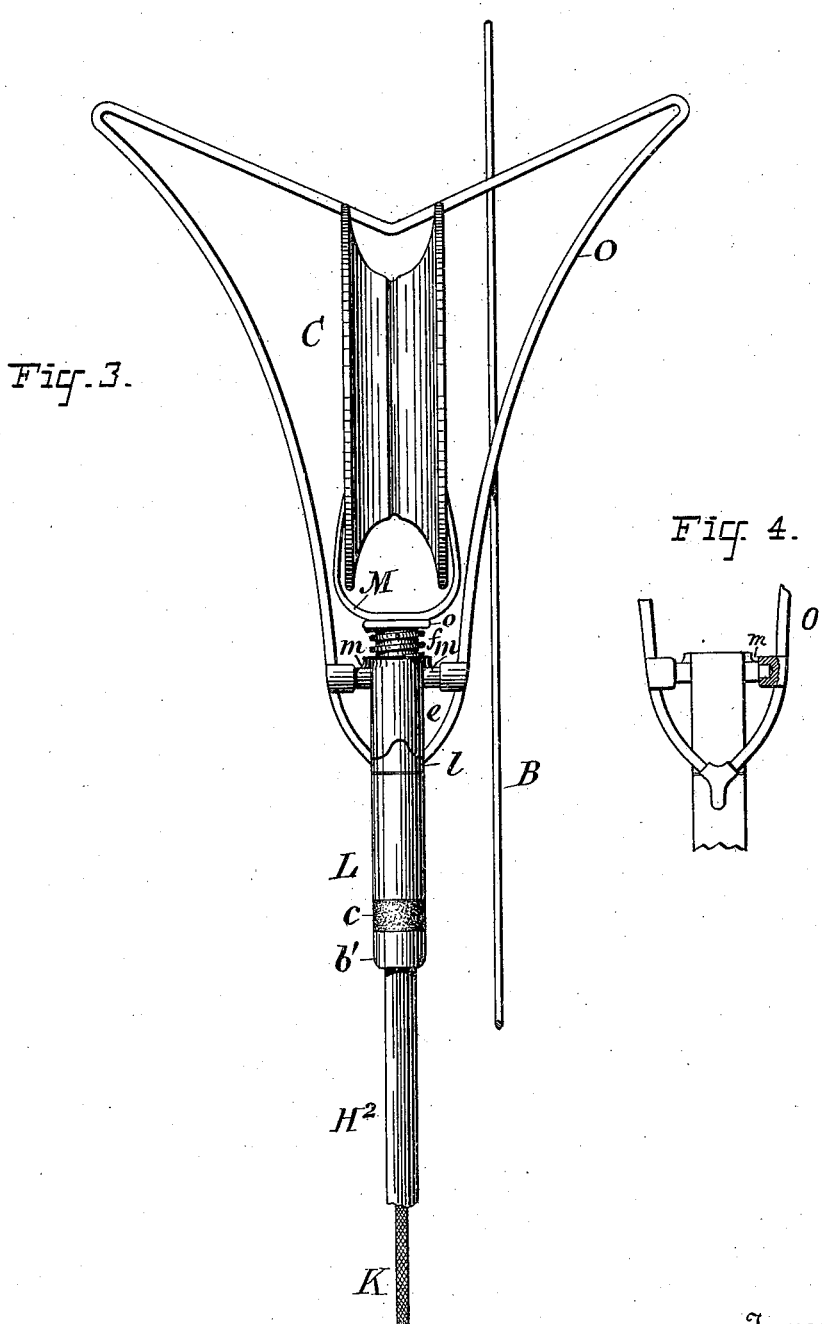

(No Model.) 5 Sheets—Sheet 4.

F. J. SPRAGUE & P. F. O'SHAUGHNESSY.
ELECTRIC RAILWAY TROLLEY.

No. 504,255. Patented Aug. 29, 1893.

(No Model.) 5 Sheets—Sheet 5.
F. J. SPRAGUE & P. F. O'SHAUGHNESSY.
ELECTRIC RAILWAY TROLLEY.
No. 504,255. Patented Aug. 29, 1893.
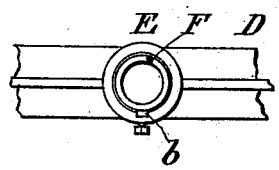
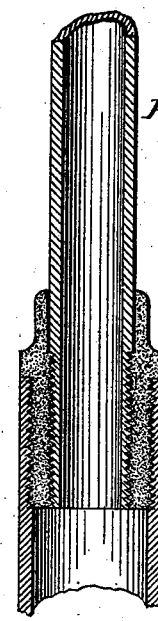
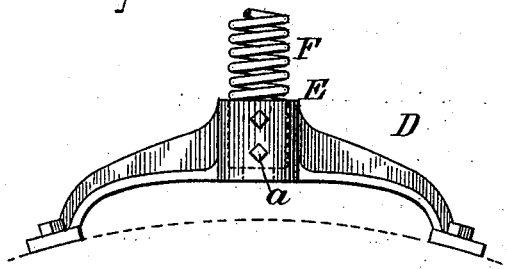
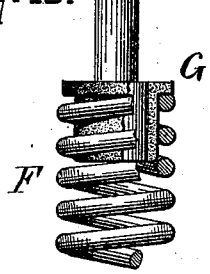
Witnesses.
Inventors
Frank J. Sprague
Patrick F. O'Shaughnessy
By their Attorneys

UNITED STATES PATENT OFFICE.

FRANK J. SPRAGUE AND PATRICK F. O'SHAUGHNESSY, OF NEW YORK, N. Y., ASSIGNORS TO THE SPRAGUE ELECTRIC RAILWAY AND MOTOR COMPANY, OF SAME PLACE.

ELECTRIC-RAILWAY TROLLEY.

SPECIFICATION forming part of Letters Patent No. 504,255, dated August 29, 1893.

Application filed January 19, 1889. Serial No. 296,873. (No model.)

*To all whom it may concern:*

Be it known that we, FRANK J. SPRAGUE and PATRICK F. O'SHAUGHNESSY, citizens of the United States, residing at the city of New York, in the county and State of New York, have jointly invented a certain new and useful Improvement in Electric Railways, of which the following is a specification.

Our invention relates to that class of electric railways in which a contact device carried by the car makes an underneath contact with an overhead conductor for supplying current to the motor on the car.

More especially our invention relates to the construction and arrangement of the contact device and the support for the same, our object being to provide a simple and convenient construction and arrangement of parts which shall permit lateral and longitudinal inclination of the support and which shall be otherwise effective for the purpose.

The main feature of our invention is the use of a spring coiled on a vertical axis, for supporting the contact device, this furnishing a universally flexible support, and also one which opposes any deflection in any direction from a vertical position, whereby the contact device adapts itself to all variations in the elevation and direction of the line and is at the same time kept constantly and firmly pressed against the wire.

Our invention is illustrated in the accompanying drawings.

Figure 5:
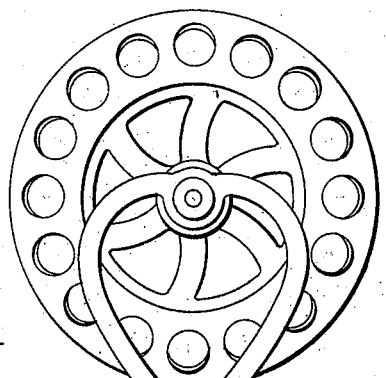
Figure 6:
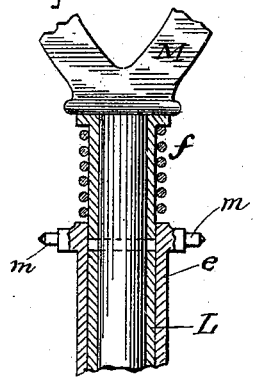
Figure 7:
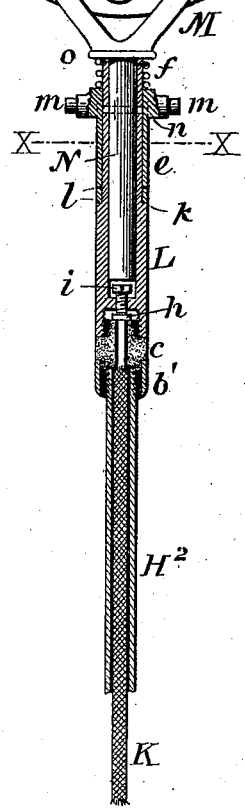

Figure 1 is a side elevation of a railway car embodying our invention; Fig. 2, a side elevation of the contact wheel or trolley; Fig. 3, a top view of the same. Fig. 4 illustrates the support for the guide. Fig. 5 is a side elevation of the trolley with a vertical section of the upper part of its support; Fig. 6, a vertical section of the upper part of the support on a somewhat larger scale; Fig. 7, a cross section on the line X—X of Fig. 5; Fig. 8, an elevation of a portion of the pole; Fig. 9, a section of the joint between two sections of the pole; Fig. 10, an elevation of the supporting spring; Fig. 11, a front view of the standard on the car roof; Fig. 12, a top view of said standard, and Figs. 13, 14, and 15 show other forms of vertical springs.

A is an electric railway car which carries an electric motor for propelling it, which motor receives current from the overhead line B by means of a traveling contact trolley C, which makes an underneath contact with said line.

Extending transversely across the curved roof of the car is an arched standard D at whose middle part is a socket E. This standard is bolted to the roof of the car as shown in Figs. 1 and 11.

In the socket E is inserted a vertically placed spiral spring F, such spring being preferably clamped in said socket by set screws $a$ which set through the socket against a loose key $b$, which bears against the spring. The spring extends above the socket a sufficient distance to give the support the required flexibility, and at its upper end it holds a flanged sleeve G of insulating material, which surrounds the lower end of the hollow pole H. The pole which supports the trolley is as shown made up of three hollow sections H, H' and $H^2$ each of which is smaller than the preceding section, so that a tapering pole is produced. It is evident that the number of sections may be greater or less than that shown. The pole sections are joined together in the manner illustrated in Fig. 9 by means of a sleeve I of insulating material, which sleeve is screw threaded both internally and externally and is screwed into the section H and upon the section H'. Through the hollow pole there extends an insulated wire K by which current is conveyed to the motor.

At the top of the pole a socket is provided for holding the trolley, such socket being constructed and arranged as follows, so that a circuit to the motor is completed by placing the shank of the trolley in its socket. On the upper end of the hollow pole section $H^2$ is screwed a hollow block of insulating material $c$ which is surrounded by a metal collar $b'$ and upon the top of which is screwed a hollow metal socket L. The wire K passes through the block $c$ and terminates in a head $h$ above said block. A screw $i$ passing through the bottom of the socket L sets against the head $h$ and so makes an electrical connection between the socket L and wire K, although such socket is effectively insulated from the pole. The socket L is formed with a shoulder at $k$, and above the shoulder is placed a collar $l$ which has an inclined upper edge as shown in Figs. 2 and 3 and above said collar is a long sleeve $e$ whose lower edge fits the upper edge of said collar $l$. The upper end of the sleeve $e$ is formed or provided with pins $m$ extending from it. The socket E has a cross pin $n$ extending internally across it.

Upon the socket L above the sleeve $e$ is coiled a small spiral spring $f$.

The trolley C is a grooved wheel preferably of the form shown and is carried on an axis between two supports M. The supports M are joined below the trolley and there extends from them a cylindrical shank N which shank is split or divided longitudinally as shown in Fig. 7, and has a flange $o$ at its junction with the frame M. The shank is inserted in the socket L with its two parts passing on each side of the cross pin $n$ so that the shank is prevented from turning in the socket, and it will be seen that the placing of the shank in the socket completes the circuit from the trolley to said socket and thence to the wire K. The spring $f$ is slightly compressed between the flange $o$ and the top of the sleeve $e$ when the trolley is in position.

Upon the pins $m$ is pivoted the guide O. This guide is made of a heavy wire or a casting, its two sides converging at the lower end below the pivot and flaring out on each side of the trolley to the highest point and being joined together by a V-shaped wire at their upper ends. At the lower ends of this guide where its two sides come together a cord or line P is attached to the guide which extends down to the platform of the car, and terminates there in a suitable handle Q. By means of this cord the person in charge of the car can throw the guide O into the position shown in dotted lines in Fig. 2 for the purpose of guiding the trolley on to the line when it becomes displaced therefrom, either accidentally or in reversing the inclination of the trolley support when the direction of movement of the car is reversed.

In Fig. 3 the trolley is illustrated as off the line and it will be seen that when the trolley is drawn down by the cord P below the line it is deflected by the guide to one side and when allowed to rise against the wire, the flaring guard O will engage with the wire and guide the trolley to it. When the inclination of the trolley support is to be reversed the operator draws on the cord P which first throws the guide O into its higher position and then brings the trolley down from the line and he then lets the pole swing over on the spring F so as to assume the other inclination and then allows the trolley to rise against the wire again. The spring $f$ and the inclined shape given to the edge of the collar $l$ permit a retarded turning movement of the guide O, and this construction furnishes also a swiveling connection of the hauling line with the pole so that the operator can not only reverse the position of the guide by turning it around the pole when the motion of the car is reversed, but will also bring the line itself around to the other side so as to attach it at the other end of the car; and the retarding of this motion due to shape of the collar $l$ prevents the guide from turning accidentally at any time.

Figs. 13, 14 and 15 show other forms of springs each of which is coiled on a vertical axis and which come within the scope of my invention. Fig. 13 shows a spring whose coils decrease in diameter toward the top of the spring. Fig. 14 shows one arranged in the reverse way, and Fig. 15 shows a spring wound with its coils all in the same horizontal plane. It will be seen that the use of springs like these or any springs which are coiled on a vertical axis furnishes a universally flexible support for the contact device permitting the inclination of the same in every direction, and such spring also tends to resist any deflection of the contact device from a vertical position, and thereby holds such contact device constantly pressed against the overhead conductor.

What we claim is—

1. The combination with an electric railway car, of a contact device for making underneath contact with an overhead conductor and free to move both laterally and longitudinally of the car and a spring coiled around a vertical axis for supporting said contact device, substantially as set forth.

2. The combination with an electric railway car, of a contact device for making underneath contact with an overhead conductor, a pole carrying said contact device, and a universally flexible support for said pole, substantially as set forth.

3. The combination with an electric railway car, of a contact device for making an underneath contact with an overhead conductor, a pole carrying said contact device, and a universally flexible spring supporting said pole, substantially as set forth.

4. The combination with an electric railway car, of a contact device for making underneath contact with an overhead conductor, a pole carrying said contact device, and a spring support for said pole tending to resist any deflection thereof from a vertical position, substantially as set forth.

5. The combination with an electric railway car, of a contact device for making underneath contact with an overhead conductor, a pole carrying said contact device and a single spring connected with said pole and tending to resist any deflection thereof from a vertical position, substantially as set forth.

6. The combination with an electric railway car, of a pole, a contact device carried by said pole for making underneath contact with an overhead conductor, and a spring coiled on a vertical axis supporting said pole, substantially as set forth.

7. The combination with an electric railway car, of a pole carried thereby, a contact device carried by said pole for making underneath contact with an overhead conductor, and a spiral spring supporting said pole and rigidly attached to the car, substantially as set forth.

8. The combination with an electric railway car, of a socket on the roof of said car, a spiral spring rigidly secured in said socket, a pole carried by said spring and a contact device carried by said pole for making underneath contact with an overhead conductor, substantially as set forth.

9. The combination with an electric railway car, of a socket on the roof of the car, a spiral spring in said socket a vertical key and set screws for holding said spring in said socket, a pole carried by said spring and a contact device carried by said pole for making underneath contact with an overhead conductor, substantially as set forth.

10. The combination of a car, an overhead conductor, a pole, a contact device carried by the pole and making an underneath contact with said conductor, and a spring support connecting said pole with said car and tending to resist both lateral deflections and longitudinal deflections of said pole from a vertical position, said pole being of such length that when in contact with said overhead conductor, it assumes an inclined position, substantially as set forth.

11. The combination of a car, an overhead conductor, and a pole carrying a contact device for making an underneath contact with said conductor, said pole having normally a vertical position, and being so connected with the car at its lower extremity that it is adapted to rock either transversely or longitudinally of the car, and being of such length as to assume an inclined position when in contact with the overhead conductor, substantially as set forth.

12. The combination of a car, an overhead conductor, a pole carrying a contact device for making an underneath contact with said conductor, said pole having normally a vertical position, and a spring support connecting said pole with the car at its lower extremity, said pole being so connected with said spring support that it is adapted to rock either transversely or longitudinally of the car, and said spring support tending to resist such deflections, said pole being of such length as to assume an inclined position when in contact with the overhead conductor, substantially as set forth.

13. The combination with an electric railway car, of a pole carried by said car, and composed of sections of different diameters connected by insulating joints and a contact device carried by said pole for making underneath contact with an overhead conductor, substantially as set forth.

14. The combination with an electric railway car, of a spiral spring on said car, a metal pole carried by said spring, an insulating sleeve between said pole and said spring and a contact device carried by said pole for making underneath contact with an overhead conductor, substantially as set forth.

15. The combination with an electric railway car, of a support on the roof of the car, a contact device removably attached to said support and electrical contacts carried by the contact device and by said support and automatically joined by the mechanical connection of the contact device with the support whereby the circuit of said contact device is completed by the placing of the contact device on its support, substantially as set forth.

16. The combination with an electric railway car, of a pole carried by said car, a socket at the top of said pole, and a contact device adapted to run upon the under-side of the conductor and having a rigidly connected shank entering said socket, substantially as set forth.

17. The combination with an electric railway car, of a pole on said car, a socket at the top of said pole, a cross pin in said socket and a contact device having a split shank entering said socket, substantially as set forth.

18. The combination with an electric railway car, of a hollow pole on said car and an electrical conductor in said pole, a socket at the top of said pole, a terminal of said conductor in said socket, and a contact device having a shank entering said socket, substantially as set forth.

19. The combination with an electric railway car, of a hollow metal pole on said car, an insulated conductor in said pole, a metal socket carried by said pole and insulated therefrom, said wire being connected with said socket, and a contact device having a shank entering said socket, substantially as set forth.

20. The combination with an electric railray car, of a standard on the roof of the car, a pole carried by said standard and insulated therefrom, a contact device carried by said pole and insulated therefrom, and a conductor connected with said contact device and extending to the car, substantially as set forth.

21. The combination with an electric railway car, of a standard on the roof of said car, a pole carried by said standard and insulated therefrom, a contact device carried by said pole and insulated therefrom, a conductor in said pole, and electrical contacts whereby the circuit is closed to said conductor by the placing of the contact device on said pole, substantially as set forth.

22. The combination with an electric railway car, of a pole on said car, a contact device carried by said pole, and a guide for said contact device adapted to swing around said pole, substantially as set forth.

23. The combination with an electric railway car, of a pole on said car, a contact device at the top of said pole for making underneath contact with an overhead conductor and a hauling line having a swiveling connection with the top of said pole, substantially as set forth.

24. The combination with an electric railway car, of a pole on said car, a contact device at the top of said pole, a guide for said contact device adapted to swing around said pole, and a hauling line attached to said guide, substantially as set forth.

25. The combination with an electric railway car, of a pole on said car adapted to rock on either side of a transverse axis, a contact device on said pole for making underneath contact with an overhead conductor, and a hauling line attached to said pole by a swiveling connection, substantially as set forth.

26. The combination with an electric railway car, of a spiral spring on said car, a pole carried by said spring, a contact device carried by said pole for making underneath contact with an overhead conductor and a hauling line attached to said pole by a swiveling connection, substantially as set forth.

27. The combination with an electric railway car, of a pole on said car, a contact device carried by said pole, a guide for said trolley adapted to swing around said pole and means for retarding the movement of said guide, substantially as set forth.

28. The combination with an electric railway car, of a pole on said car, a contact device carried by said pole, a guide for said trolley adapted to swing around said pole, and the inclined stop and spring for retarding the movement of said guide, substantially as set forth.

This specification signed and witnessed this 14th day of January, 1889.

FRANK J. SPRAGUE.
PATRICK F. O'SHAUGHNESSY.

Witnesses:
E. VAUGHAN,
I. E. MOULTROP.